United States Patent

Shindo et al.

[11] Patent Number: 5,181,132
[45] Date of Patent: Jan. 19, 1993

[54] LIQUID CRYSTAL DEVICE AND METHOD FOR PRODUCING THE SAME WITH METAL SPACER IN HOLE OF THIN FILM DEVICE'S INSULATOR

[75] Inventors: Hitoshi Shindo, Isehara; Jun Nakayama, Atsugi, both of Japan

[73] Assignee: Canon Kabushiki Kaisha, Tokyo, Japan

[21] Appl. No.: 708,219

[22] Filed: May 31, 1991

[30] Foreign Application Priority Data

May 31, 1990 [JP] Japan .................. 2-139617
Jul. 10, 1990 [JP] Japan .................. 2-181977

[51] Int. Cl.⁵ .............. G02F 1/1343; G02F 1/1339
[52] U.S. Cl. ............................... 359/58; 359/59; 359/60; 359/81
[58] Field of Search ........... 350/339 F, 344; 359/59, 359/81, 58, 60

[56] References Cited

U.S. PATENT DOCUMENTS

| | | | |
|---|---|---|---|
| 4,283,119 | 8/1981 | Hofmann | 359/81 |
| 4,684,218 | 8/1987 | Aizawa et al. | 350/339 F |
| 4,733,948 | 3/1988 | Kitahara | 350/339 F |
| 4,734,514 | 3/1988 | Melas et al. | 568/17 |
| 4,867,537 | 9/1989 | Aoki et al. | 350/339 F |
| 4,904,056 | 2/1990 | Castleberry | 350/344 |

FOREIGN PATENT DOCUMENTS

| | | | |
|---|---|---|---|
| 0039871 | 11/1981 | European Pat. Off. | 359/81 |
| 0179922 | 5/1986 | European Pat. Off. | |
| 0289415 | 11/1988 | European Pat. Off. | 359/81 |
| 0164723 | 8/1985 | Japan | 350/344 |
| 0182414 | 9/1985 | Japan | 350/344 |
| 0217337 | 10/1985 | Japan | 350/339 F |
| 62-087936 | 4/1987 | Japan . | |
| 0280820 | 12/1987 | Japan | 359/81 |
| 63-249107 | 10/1988 | Japan . | |
| 1-229205 | 9/1989 | Japan . | |

*Primary Examiner*—William L. Sikes
*Assistant Examiner*—Anita Pellman Gross
*Attorney, Agent, or Firm*—Fitzpatrick, Cella, Harper & Scinto

[57] ABSTRACT

This invention is to improve the assembling precision of an electronic device including a functional member, other than an electrode, requiring alignment, such as a light shield member or a spacer. Such functional member is composed of aluminum or a metal principally composed of aluminum, deposited by a CVD process utilizing alkylaluminum hydride gas.

7 Claims, 9 Drawing Sheets

LIQUID CRYSTAL DEVICE AND METHOD FOR PRODUCING THE SAME WITH METAL SPACER IN HOLE OF THIN FILM DEVICE'S INSULATOR

BACKGROUND OF THE INVENTION

Field of the Invention

The present invention relates to an electronic device such as a liquid crystal display device, a photoelectric converting device or the like, and more particularly to such a device having a metal area other than electrodes and a method for producing such electronic device.

Related Background Art

In the following a liquid crystal display device will be explained as an example. A conventional liquid crystal display is composed of either 1) a time-split drive structure provided with two substrates bearing respectively transparent stripe electrodes in mutually orthogonal manner and sandwiching therebetween TN (twisted nematic) liquid crystal or ferroelectric liquid crystal as an electrooptical modulating material (said structure being called simple matrix drive method) or 2) an active matrix drive structure having a switching element such as a thin film transistor (TFT) or a thin film diode for each display pixel (such structure being called active matrix drive method).

For achieving color display with such panel structure, it is necessary to form transmissive color filters of red, green and blue on one of the paired substrates. It is also desirable to form an opaque layer, in the areas between the color filters formed corresponding to the display pixels, in order to intercept the stray light.

A conventional example of formation of such light-intercepting opaque layer will be explained with reference to FIG. 1. A transparent substrate 21, constituting one of the above-mentioned paired substrates, bears thereon a first transparent electrode layer 22, on which formed is a filter layer including a cyclic repetition of a blue colored layer 23a, a green colored layer 23b and a red colored layer 23c. In such structure, the opaque layer is formed as a metal layer 24, composed for example of Al or Cr, positioned under the colored filter layers 23a, 23b, 23c as illustrated, or positioned on said color filter layers (structure not shown). Otherwise such opaque layer may also be formed, though not illustrated, by mutually superposing the colors of red, green and blue in the positions of such opaque layer, or by forming a black-dyed layer in case of a color filter obtained by dyeing a polymer film for example of polyvinyl alcohol with dyes.

Such methods for forming the opaque layer involve alignment between the filter (colored) layers and the opaque (metal) layer, and inevitably result in formation of superposed portions therebetween, thus leading to a loss in the aperture ratio of the pixels or eventually a defect in the orientation of liquid crystal resulting from a stepped portion.

Such problem of alignment appears not only in the light-intercepting layer for planar partition as shown in FIG. 1, but also in a three-dimensional structure in which functional elements such as phototransistors and a wiring layer are superposed in succession on a semiconductor substrate and an opaque layer is formed thereon.

Also in the spacers for the liquid crystal display device or in the spacers used in the contact image sensor, for maintaining a protective member such as a micro sheet glass, coming into contact with the original document, at a predetermined distance from the sensor, the uniform planarity of the device is determined by the positioning of such spacers.

In the following there will be explained the technical problems in the conventional liquid crystal display device, relative to the spacers for maintaining a predetermined distance between the paired substrates.

The preparation of a liquid crystal display panel follows steps, as shown in FIG. 2, of formation of thin film devices 52 on a first glass substrate 51, printing of seal portions 53, scattering of spacers 54 on the first glass substrate 51, adhesion of a second glass substrate 21, bearing a transparent counter-electrode 22 and a liquid crystal orienting film 56 thereon, with the first glass substrate 51, and filling of liquid crystal 58 between the glass substrates.

The above-mentioned thin film device 52 is more specifically a thin film transistor as shown in FIG. 3, in which shown are a liquid crystal orienting film 56, a gate electrode 59, a gate insulation film 60, a semiconductor layer 61, a low-resistance semiconductor layer 62, a drain electrode 63, a source electrode 64, a display pixel electrode 65, a silicon nitride film (inorganic protective film) 66, a polyimide (organic protective film) 67, an opaque layer 68, and an organic protective film 69. After the formation of the thin film transistors of the above-explained structure, namely the thin film devices, on the first glass substrate 51, the liquid crystal display panel is obtained by the steps, as explained above, of printing of the seal portions 53, scattering of the spacers 54 on the first glass substrate 51, adhesion of the second glass substrate 21, bearing the transparent counter-electrode 22 and the liquid crystal orienting film 56 thereon, to the first glass substrate 51, and the filling of liquid crystal 58 between the substrates.

In the above-explained conventional structure, however, the spacers are positioned randomly, without any position control. Thus, a spacer 54, if accidentally positioned on the thin film device 52 and applied by the pressure of liquid crystal filling, may destruct the protective film of said device 52, thereby inducing defective function of the device and deteriorating the production yield of the liquid crystal display panels.

SUMMARY OF THE INVENTION

In consideration of the above-mentioned technical drawbacks in the prior technology, a principal object of the present invention is to improve the assembling precision of an electronic device including a functional member such as a light intercepting member or a spacer requiring alignment other than the electrode.

Another object of the present invention is to provide an electronic device including a metal member principally composed of aluminum as a functional member different from the electrode.

Still another object of the present invention is to provide the electronic device including a color liquid crystal display device provided with a pair of parallel substrates which respectively bear transparent electrodes thereon, and sandwich liquid crystal therebetween, and one of which is provided with a color filter layer thereon while the other of which is provided with thin film devices thereon, wherein said metal member is a light-intercepting metal layer principally composed of aluminum and formed solely in the spaces between the color filters positioned corresponding to the display pixels.

A second transparent electrode layer is preferably formed on said color filter layer, and said light intercepting layer is preferably as thick as said color filter layer.

Still another object of the present invention is to provide a method for producing an electronic device including a metal member serving as a functional member different from the electrode and principally composed of aluminum, wherein said metal member is formed by deposition of a metal principally composed of aluminum selectively on an electron-donating substrate surface by a CVD process utilizing alkylaluminum hydride gas and hydrogen gas.

Still another object of the present invention is to provide a method for producing an electronic device including a color liquid crystal display device provided with a pair of parallel substrates which respectively bear transparent electrodes thereon, and sandwich liquid crystal therebetween, and one of which is provided with a color filter layer thereon while the other of which is provided with thin film devices thereon, wherein said method comprises steps of forming a colored layer on the transparent electrodes of one of said substrates, and forming a light-intercepting layer constituting said metal member, in the areas where said electrodes are exposed between the colored layers formed corresponding to the display pixels.

Said light-intercepting layer is preferably as thick as said color filter layer.

Still another object of the present invention is to provide a method or producing said electronic device including a color liquid crystal display device provided with a pair of parallel substrates which respectively bear transparent electrodes thereon, and sandwich liquid crystal therebetween, and one of which is provided with a color filter layer thereon while the other of which is provided with thin film devices thereon, wherein said method comprises a step of forming, on wirings constituting said thin film device, an insulation film with apertures for exposing a part of said wirings, a step of forming said metal members in said apertures, a step of forming an insulation film on said metal members, and a step of positioning the other substrate on said metal members.

In the above-mentioned methods, said alkylaluminum hydride is preferably dimethylaluminum hydride.

The present invention enables highly precise positioning required in various electronic devices by the use of monocrystalline aluminum as a functional member other than an electrode, because monocrystalline aluminum, being featured by a very low hillock frequency, a high strain and a low tendency of undesirable influence by eutectic reactions for example with silicon, shows little time-dependent physical changes.

Also the CVD process utilizing alkylaluminum hydride and hydrogen allows to selectively deposit metal principally composed of aluminum on the electron-donating substrate surface even if said surface is very small in size, thereby easily realizing a satisfactorily reproducible self-alignment process.

Furthermore, the present invention allows to form, on a substrate of a liquid crystal display panel of the electronic device, a spacer with satisfactory position control by the formation of a metal deposition film, principally composed of aluminum, of satisfactory planarity and durability on the wiring of the thin film device through the use of a selective CVD process. Said spacer can satisfactorily bear the pressure applied for example at the filling of liquid crystal, thereby preventing the defective function of the thin film devices resulting from the defects in the spacers, and improving the production yield of the liquid crystal display panels.

DETAILED DESCRIPTION OF THE PREFERRED EMBODIMENTS

Figure 1:
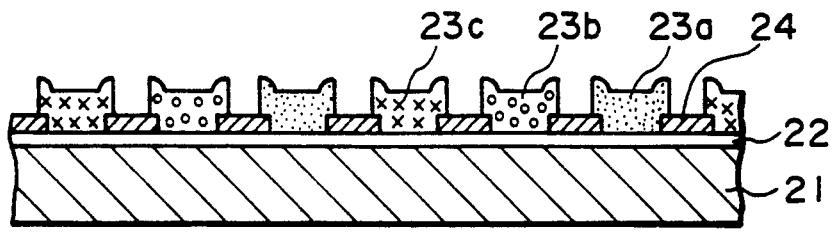
FIG. 1 is a cross-sectional view of a substrate with color filters, formed by a prior technology.
Figure 2:
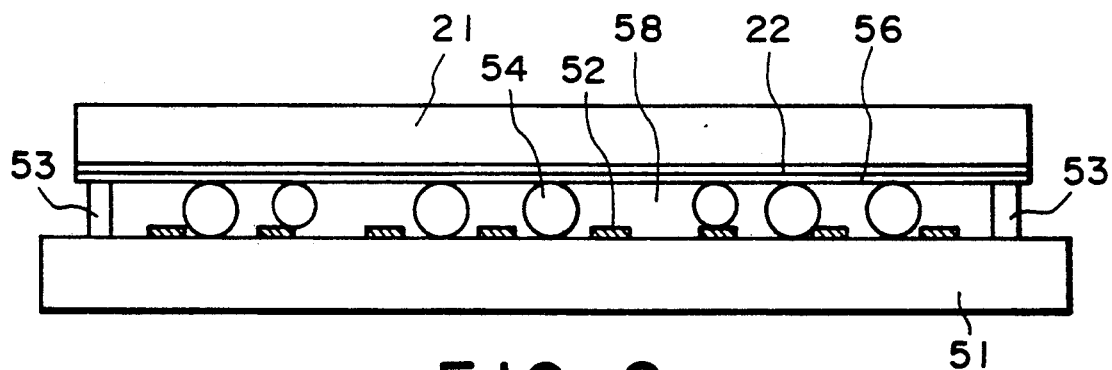
FIG. 2 is a cross-sectional view of a conventional liquid crystal panel.
Figure 3:
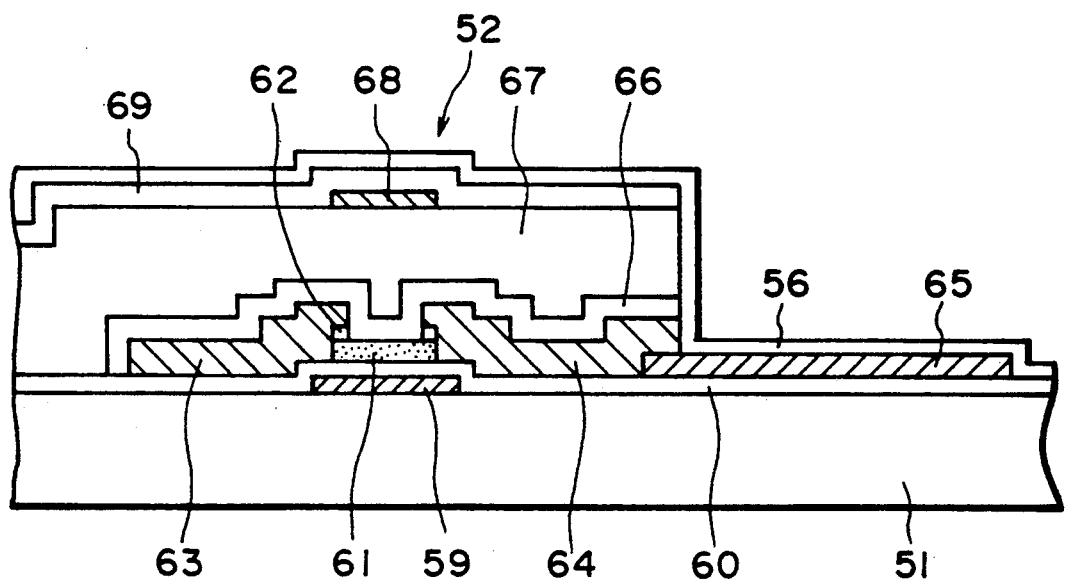
FIG. 3 is a cross-sectional view of a conventional thin film transistor.

In preferred embodiments of the present invention, superior properties of monocrystalline aluminum are utilized as a functional member such as a spacer or a light shield member in an electronic device, other than an electrode for guiding an electric current.

For this purpose there is utilized a CVD process employing alkylaluminum hydride gas and hydrogen gas, which can deposit a metal principally composed of aluminum, i.e. pure aluminum, aluminum containing other atoms or an aluminum alloy, solely on an electron-donating substrate surface, and the deposited film thus obtained can exhibit extremely good functionality because of its satisfactory flatness and durability. Examples of alkylaluminum hydride include $Al(CH_3)_2H$ (dimethylaluminum hydride: DMAH), $Al(CH_3)H_2$ (monomethylaluminum hydride: MMAH) etc., among which DMAH is particularly preferred.

An electron-donating material means a substrate material in which free electrons are present or are intentionally generated and which has a surface capable of accelerating a chemical reaction by electron transfer with molecules of raw material gas deposited on said substrate surface. For example metals and semiconductive materials generally fall into this category. Also materials having a thin oxide film on the metal or semiconductor surface are included in the electron-donating material of the present invention because a chemical reaction can be induced by electron transfer between the substrate surface and the raw material molecules deposited thereon. Furthermore materials with an insulating surface may also be included in the electron-donating materials of the present invention, if the physical structure or chemical bonding state of such insulating surface is modified by irradiation with a high energy beam such as alpha-ray, beta-ray, gamma-ray, ion beam or electron beam, in such a manner that a chemical reaction can be induced by electron transfer between the substrate surface and the deposited molecules of the raw material.

Examples of the elctron-donating material include P-, I- and N-type semiconductors, for example two-, three- and multi-element III-V compound semiconductors obtained by combining element(s) of the group III of the periodical table such as Ga, In, Al etc. and element(s) of the group V such as P, As, N etc.; semiconductive materials such as monocrystalline or amorphous silicon; and metals, alloys and silicides such as tungsten, molybdenum, tantalum, cobalt, titanium, aluminum, titanium-aluminum, titanium nitride, aluminum-silicon-copper, aluminum-palladium, tungsten silicide, titanium silicide, aluminum silicide, molybdenum silicide and tantalum silicide.

Examples of insulating material include silicon oxide and silicon nitride, of which surface is rendered chemically active by irradiation with a high energy beam.

On the other hand, examples of an electron non-donating material which constitutes a surface not causing selective deposition of aluminum or a metal principally composed of aluminum include insulating materials with a stable surface not easily causing electron transfer, for example silicon oxide formed by thermal oxidation or CVD; glass materials such as BSG, PSG and BPSG; oxide films and thermal nitride films; a dn silicon nitride film formed by plasma CVD, low pressure CVD or ECR-CVD.

At the selective aluminum deposition, the substrate surface is maintained by direct or indirect heating, preferably at a temperature at least equal to the decomposition temperature of alkylaluminum hydride but lower than 450° C., and more preferably within a range from 260° to 440° C.

The substrate may be heated to the above-mentioned temperature range either by direct heating or by indirect heating, but direct heating allows to obtain an aluminum film of satisfactory quality with a high deposition speed. For example the aluminum film deposition conducted with the substrate surface temperature maintained within the more preferred range of 260° to 440° C. provides a film of satisfactory quality with a deposition speed of 300 to 5000 Å/min. which is higher than that obtainable with resistance heating. Such direct heating (in which substrate itself is heated by direct transfer of energy from heating means) is achieved for example by heating with a lamp, such as a halogen lamp or a xenon lamp. Also indirect heating can be achieved by resistance heating, conducted by a heat generating member provided in a support member for supporting a substrate to be subjected to film deposition, in a space for such film deposition.

This CVD process, if applied to a substrate bearing both an electron-donating surface area and an electron non-donating surface area, forms monocrystalline aluminum with satisfactory selectivity, solely on the electron-donating surface area. Such aluminum, showing reduced frequencies of hillock formation and alloy spike formation, exhibit excellent results in all the characteristics required as a functional material.

This is presumably attributable to a fact that the formation of alloy spikes etc. resulting from eutectic reactions with the underlying substrate such as silicon is extremely decreased because aluminum of satisfactory quality can be selectively deposited on the electron-donating conductive or semiconductive surface and also because thus deposited aluminum shows excellent crystalline character.

As explained in the foregoing, aluminum deposited on the electro-donating surface by this CVD process assumes a monocrystalline structure. In addition, this Al-CVD process can also selectively deposit following metal films principally composed of aluminum, with excellent film quality.

For example, selective deposition of various conductive materials such as Al-Si, Al-Ti, Al-Cu, Al-Si-Ti or Al-Si-Cu can be achieved by introducing a mixed gaseous atmosphere containing, in addition to alkylaluminum hydride gas and hydrogen gas;

Si-containing gases such as $SiH_4$, $Si_2H_6$, $Si_3H_8$, $Si(CH_3)_4$, $SiH_2Cl_2$ and $SiHCl_3$;

Ti-containing gasses such as $TiCl_4$, $TiBr_4$ and $Ti(CH_3)_4$;

Cu-containing gasses such as copper bisacetylacetonate $Cu(C_5H_7O_2)$, copper bisdipivaloylmethanite $Cu(C_{11}H_{19}O_2)_2$ and copper bishexafluoroacetylacetonate $Cu(C_5HF_6O_2)_2$; and so on in suitable combinations.

EXPERIMENTAL EXAMPLES

In the following there will be experimental results indicating the superior nature of the Al-CVD process explained above and the satisfactory quality of the aluminum film deposited in apertures.

At first there were prepared plural N-type monocrystalline silicon wafers, each bearing a $SiO_2$ layer of a thickness of 8000 Å by thermal oxidation, in which apertures of various sizes from $0.25 \times 0.25$ μm to $100 \times 100$ μm were formed by patterning to expose the underlying monocrystalline silicon (sample 1-1).

These samples were subjected to the formation of aluminum film by the Al-CVD process, utilizing DMAH as the raw material gas and hydrogen as the reaction gas, with a total pressure of 1.5 Torr and a DMAH partial pressure of $5.0 \times 10^{-3}$ Torr, and with the substrate surface temperature set within a range of 200° to 490° C. by adjustment of electric power supplied to the halogen lamps used for direct heating.

The obtained results are summarized in Table 1.

TABLE 1

| | Substrate surface temp. (° C.) | | | | | | | | | | | | | | |
|---|---|---|---|---|---|---|---|---|---|---|---|---|---|---|---|
| | 200 | 230 | 250 | 260 | 270 | 280 | 300 | 350 | 400 | 440 | 450 | 460 | 470 | 480 | 490 |
| Deposition speed (Å/min.) | ←— 1000–1500 —→ | | | | | | | | | | ←— 3000–5000 —————————————→ | | | | |
| Throughput (wafer/hr) | ←— 7–10 ——————→ | | | | | | | | | | ←————— 15–30 ———————————→ | | | | |

TABLE 1-continued

| | Substrate surface temp. (° C.) | | | | | | | | | | | | | | |
|---|---|---|---|---|---|---|---|---|---|---|---|---|---|---|---|
| | 200 | 230 | 250 | 260 | 270 | 280 | 300 | 350 | 400 | 440 | 450 | 460 | 470 | 480 | 490 |
| Si linear defects | ←—— not observed ——————————————————————————→ | | | | | | | | | | | | | | |
| Carbon content | ←—— not detected ———————————————————————————→ | | | | | | | | | | | | | | |
| Resistivity (μΩcm) | ←— 2.7-3.3 —→|←—————— 2.8-3.4 ——————————————→ | | | | | | | | | | | | | | |
| Reflectance (%) | ←—— 85-95 ——→|←——— 90-95 ———→|←—— ca. 60 ——→ | | | | | | | | | | | | | | |
| Hillock (>1 μm) density (cm$^2$) | ←— 1-10$^2$ ——→|←——— 0-10 ————→|←—— 10-10$^4$ ——→ | | | | | | | | | | | | | | |
| Spike formation (%) destruction (frequency of 0.15 μm junction) | ←———— 0 ————————————————→|←—— 0-30 ——→ | | | | | | | | | | | | | | |

As shown in Table 1, under the conditions with the substrate surface temperature equal to or higher than 260° C. obtained by direct heating, aluminum could be selectively deposited in the apertures with a deposition speed as high as 3000-5000 Å/min.

The aluminum film obtained in the apertures within a substrate surface temperature range of 260°-440° C. shows satisfactory characteristics, with zero carbon content, resistivity of 2.8-3.4 μΩ cm, reflectance of 90-95%, hillock ($\geq 1$ μm) density of 0-10, and almost zero spike formation (probability of destruction of 0.15 μm junction).

On the other hand, in a substrate surface temperature range of 200°-250° C., the obtained film quality was considerably better than that obtained in the prior technology though it is somewhat inferior to that obtained in the temperature range of 260°-440° C., but the deposition speed could not exceed 1000-1500 Å/min., and the throughput was in a relatively low range of 7-10 wafer/hr.

With the substrate surface temperature equal to or higher than 450° C., the aluminum film in the apertures showed deteriorated characteristics, with reflectance of 60% or lower, hillock ($\geq 1$ μm) density of 10-10$^4$ cm$^{-2}$ and alloy spike formation of 0-30%.

In the following there will be explained how advantageously the above-explained method can be applied to apertures such as contact holes and through-holes.

More specifically, said method can be advantageously utilized in the contact or through hole structure consisting of the following materials.

Substrates (samples) of following structure were subjected to the aluminum film formation, under the same conditions as those in the film formation on the sample 1-1.

A sample 1-2 was prepared by forming, on a monocrystalline silicon wafer constituting first substrate surface material, a thermal SiO$_2$ film of a thickness of 8000 Å by a CVD process as a second surface material, and photolithographically forming therein apertures of 0.25×0.25 μm to 100×100 μm thereby locally exposing the underlying monocrystalline silicon surface (such sample being hereinafter represented as "CVD SiO$_2$ (or simply SiO$_2$)/mono-Si").

Similarly prepared were:

a sample 1-3 consisting of boron-doped oxide film formed by normal pressure CVD (hereinafter BSG)/monocrystalline silicon;

a sample 1-4 consisting of phosphor-doped oxide film formed by normal pressure CVD (PSG)/monocrystalline silicon;

a sample 1-5 consisting of phosphor- and boron-doped oxide film formed by normal pressure CVD (BSPG)/monocrystalline silicon;

a sample 1-6 consisting of nitride film formed by plasma CVD (P-SiN)/monocrystalline silicon;

a sample 1-7 consisting of thermal nitride film (T-SiN)/monocrystalline silicon;

a sample 1-8 consisting of nitride film formed by low pressure CVD (LP-SiN)/monocrystalline silicon; and a sample 1-9 consisting of nitride film formed by an ECR apparatus (ECR-SiN)/monocrystalline silicon.

Furthermore, samples 1-11 to 1-179 were prepared by taking all the combinations of first substrate surface materials of 18 kinds and second substrate surface materials of 9 kinds (it is to be noted that the sample numbers 1-10, 20, 30, 40, 50, 60, 70, 80, 90, 100, 110, 120, 130, 140, 150, 160 and 170 are lacking). The used first substrate surface materials were monocrystalline silicon (mono-Si), polycrystalline silicon (poly-Si), amorphous silicon (a-Si), tungsten (W), molybdenum (Mo), tantalum (Ta), tungsten silicide (WSi), titanium silicide (TiSi), aluminum (Al), aluminum-silicon (Al-Si), titanium-aluminum (Al-Ti), titanium nitride (Ti-N), copper (Cu), aluminum-silicon-copper (Al-Si-Cu), aluminum-palladium (Al-Pd), titanium (Ti), molybdenum silicide (Mo-Si) and tantalum silicide (Ta-Si). The second substrate surface materials used were T-SiO$_2$, SiO$_2$, BSG, PSG, BPSG, P-SiN, T-SiN, LP-SiN, and ECR-SiN. On all the samples mentioned above, there could be obtained aluminum films comparable in quality to that obtained on the sample 1-1 explained before.

Figure 4:
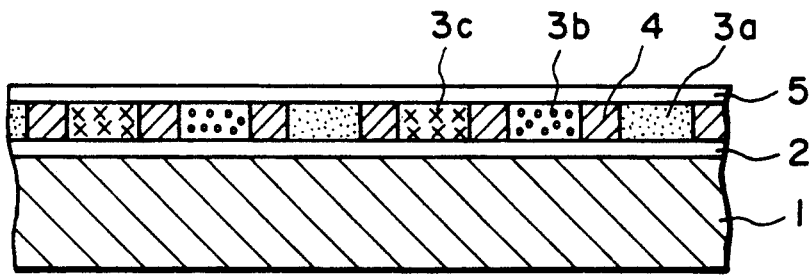
FIG. 4 is a cross-sectional view of a substrate with color filters formed according to the present invention.
Figure 5:
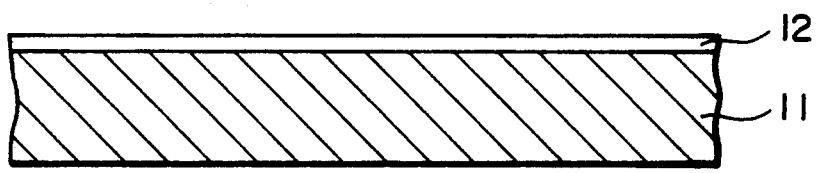
FIGS. 5 to 10 are cross-sectional views showing the method for producing a liquid crystal display device constituting a first embodiment of the present invention.

In particular, on a substrate bearing the color filters in a color liquid crystal display device as shown in FIG. 4, after the formation of a transparent electrode layer 2 on a transparent substrate 1 and the formation thereon of a color filter layer consisting of repeated arrangements of red, green and blue colored layers 3a, 3b, 3c, a light shield layer 4 was formed by selective aluminum deposition in the areas where said colored layers 3a, 3b, 3c were absent, by means of the aforementioned CVD process utilizing alkylaluminum hydride and hydrogen, capable of selectively depositing aluminum solely on the electron-donating substrate. This method enables self-alignment of the light shield layer 4 with the colored layers 3a, 3b, 3c, thereby improving the aperture rate. In FIG. 5 there is also shown an orienting layer 5 for liquid crystal. The surface step can be avoided by forming the light shield layer 4 as thick as the colored layers 3a, 3b, 3c, so that the defects in the orientation of liquid crystal resulting from the surface step in said orienting layer can be avoided. Furthermore, according to the present invention, an additional transparent electrode layer is formed on the above-explained structure, in order to reduce the capacitance between the thin film transistors and the substrate bearing the color filters.

In the following the present invention will be clarified in greater detail by embodiments thereof.

As explained in the foregoing, the selective aluminum deposition utilizing alkylaluminum hydride as the raw material is a principal component of the present invention, and the present invention is to enable, by means of this selective depositing technology, the self alignment between the light shielding aluminum layer and the colored layers in the color liquid crystal display device, thereby improving the aperture ratio of said device. The method of said selective aluminum deposition and the apparatus used therein will be explained further in the following embodiments.

EMBODIMENT 1

The present embodiment employs a color filter formed by dispersing coloring materials in a transparent resin and photolithographically patterning said resin, a thin film transistor utilizing amorphous silicon deposited by plasma CVD, and liquid crystal of twisted nematic type.

(i) At first, on a glass substrate 11 shown in FIG. 5, there was deposited a transparent electrode layer 12 of a thickness of 1000 Å, consisting of ITO (indium tin oxide), by sputtering with $Ar+O_2$ gas and an ITO target.

Figure 6:
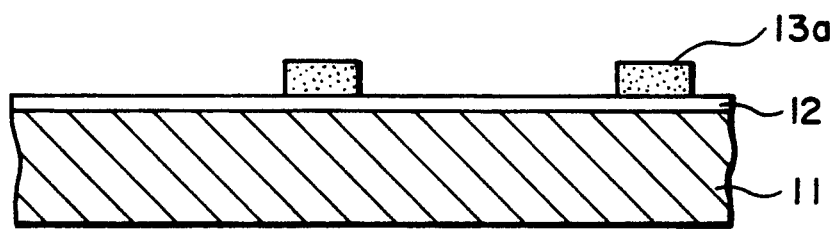

(ii) Then, as shown in FIG. 6, there was spin coated N-methyl-2-pyrrolidone solution of aromatic polyamide resin PA-100C (a trade name of Ube Kosan Co.) in which a blue coloring material Heliogen Blue L7080 (a trade name of BAFG GmbH, C.I. No. 74160) was dispersed, so as to obtain a film thickness of 1.5 μm. The obtained film was then subjected exposure to the light of a high pressure mercury lamp, image development, rinsing, and baking for 30 minutes at 150° C. to obtain blue colored layers 13a in predetermined pattern and positions.

Figure 7:
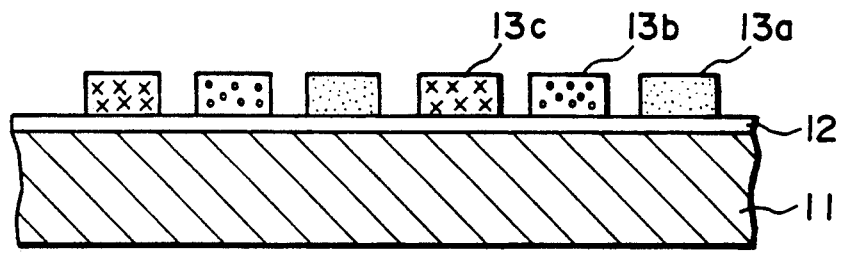
Figure 8:
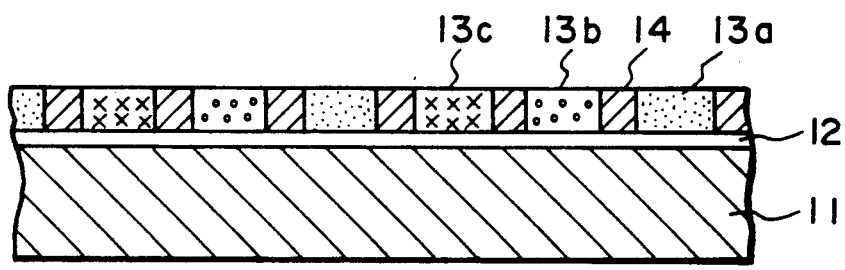

(iii) Subsequently, as shown in FIG. 7, green colored layers 13b were formed in predetermined pattern and positions by a process similar to that in (ii), employing N-methyl-2-pyrrolidone solution of said aromatic polyamide resin, in which a green coloring material Lionol Green 6YK (a trade name of Toyo Ink Co., Ltd.; C.I. No. 74265) was dispersed.

(iv) Then, on the substrate already bearing blue and green patterns, red colored layers 13c were formed in predetermined pattern and positions by a process similar to that in (ii), employing N-methyl-2-pyrrolidone solution of said aromatic polyamide resin, in which a red coloring material Irgazin Red BPT (a trade name of Ciba-Geigy Inc.; C.I. No. 71127) was dispersed. Thus obtained was a color filter layer consisting of striped patterns of red, green and blue.

Figure 11:
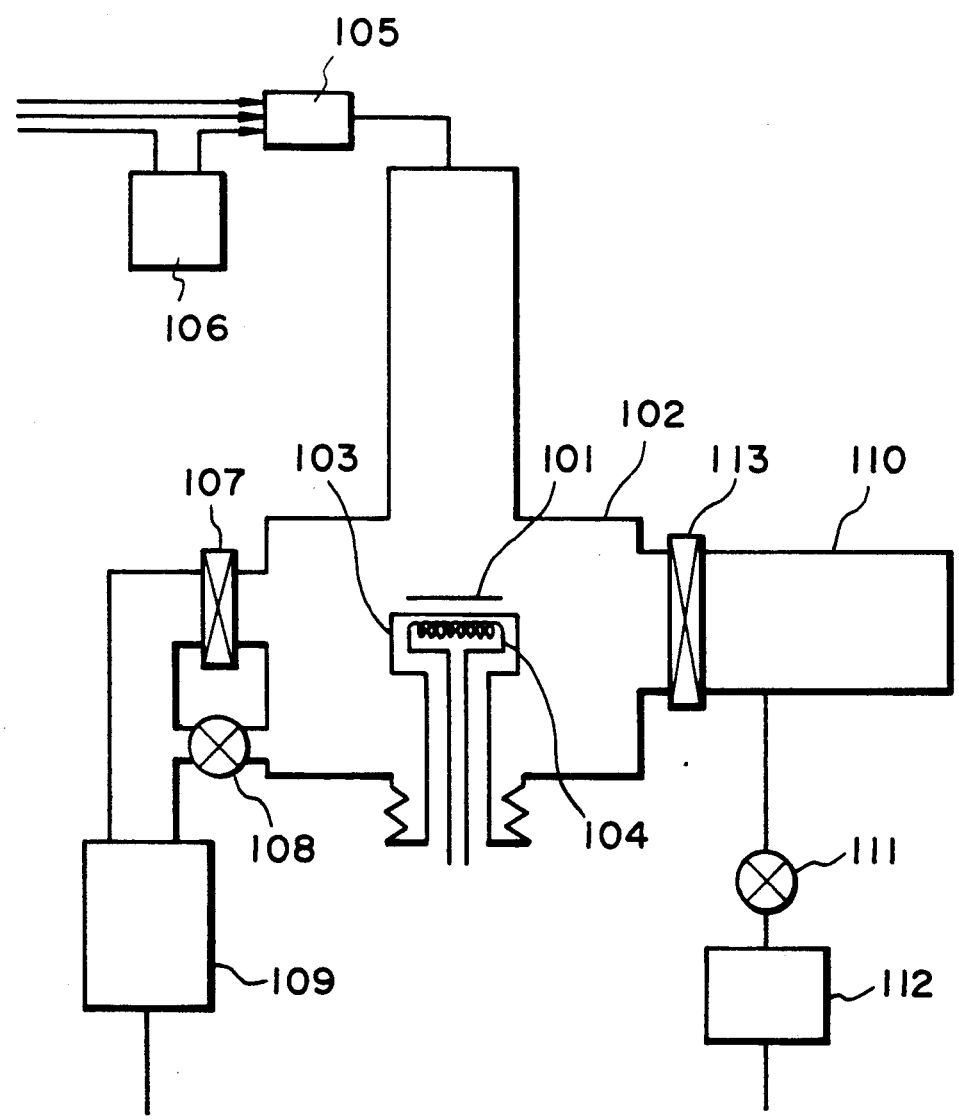
FIG. 11 is a schematic view of an aluminum CVD apparatus employed in the first embodiment of the present invention.

(v) Subsequently the above-mentioned substrate (shown in FIG. 7) was placed in a preliminary evacuation chamber 110 of a CVD apparatus shown in FIG. 11, and the atmosphere therein was replaced by hydrogen. Then a gate valve 113 was opened, the substrate was transferred into a reaction chamber 102, and the interior thereof was evacuated to about $1\times10^{-8}$ Torr by a vacuum system 109. However the aluminum film is also possible at a higher pressure.

Then DMAH (dimethylaluminum hydride) was introduced by a DMAH gas line, through a gasifier 106, utilizing hydrogen as the carrier gas.

Hydrogen was introduced as the reaction gas through a second gas line and was mixed with DMAH in a mixer 105, and the interior of the reaction chamber 102 was maintained at a predetermined pressure by regulating the aperture of a slow leak valve 108. A typical total pressure was about 1.5 Torr, with a DMAH partial pressure of about $5.0\times10^{-3}$ Torr. Then a heat-generating resistor 104 of a substrate holder 103 was energized to heat the glass substrate 101 at 200° C. In this manner a light shielding aluminum layer 14 was deposited with a thickness of 1.5 μm, same as that of the colored layers. In this operation, aluminum was deposited selectively in areas where the ITO surface was exposed, namely where the colored layers were absent.

Figure 9:
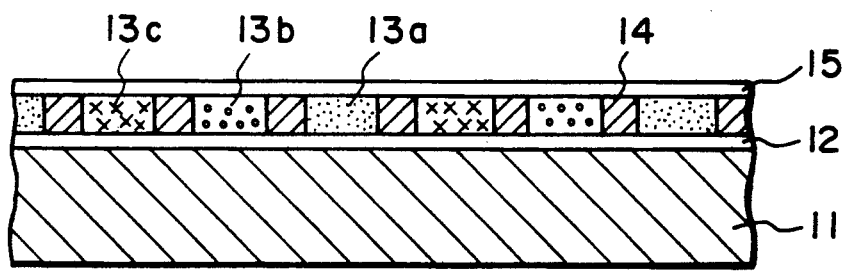

(vi) Then, as shown in FIG. 9, polyimide resin was coated with a thickness of 1200 Å over the entire surface of the aforementioned substrate, and was cured by heating for 1 hour at 250° C. to obtain an orienting layer 15 consisting of polyimide resin. Subsequently a rubbing process was applied to the surface of said resin layer to provide orienting function for the liquid crystal, and the substrate with color filters was thus completed.

Figure 10:
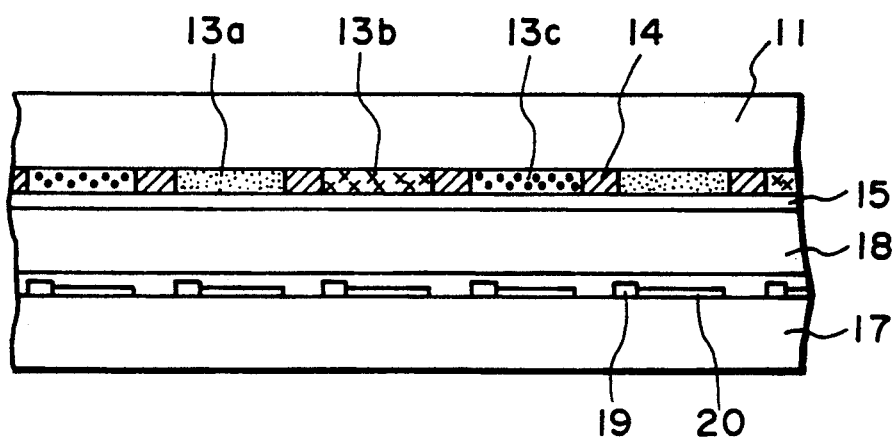

(vii) Then, as shown in FIG. 10, a TFT substrate 17, thereon bearing thin film transistors, which were separately prepared utilizing amorphous silicon deposited by plasma CVD, was positioned opposite to and adhered to the above-mentioned substrate with color filters, and twisted nematic liquid crystal 18 was filled in the gap between the substrate and sealed therein. The color liquid crystal display device of the present invention was obtained in this manner. In FIG. 10 there are shown transistors 19 and transparent electrodes 20 at the transistor side.

The color liquid crystal display device of the present embodiment showed satisfactory function, and the aperture ratio per pixel was at least equal to 80%.

EMBODIMENT 2

Figure 12:
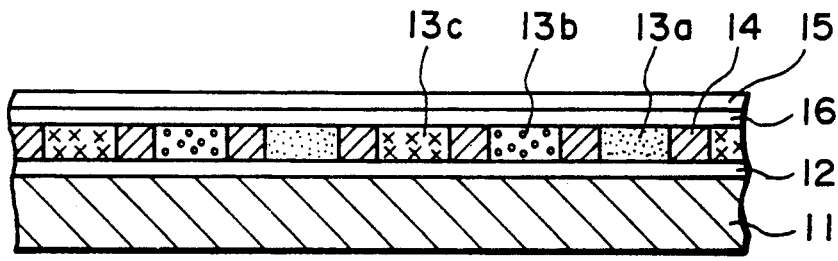
FIG. 12 is a cross-sectional view of a substrate with color filters of a second embodiment of the present invention.

The present embodiment provides a structure including a second transparent electrode layer on the color filter layers 13a, 13b, 13c in order to reduce the capacitance between the thin film transistors for liquid crystal driving and the transparent electrodes of the opposite substrate, employing formation of the color filter layers in a similar manner as in the first embodiment, thin film transistors utilizing polycrystalline silicon deposited by low-pressure CVD, and ferroelectric liquid crystal. FIG. 12 is a cross-sectional view of the substrate with color filters.

(i) A first transparent electrode 12 of a thickness of 200 Å, consisting of ITO, was deposited by sputtering on a glass substrate 1.

(ii) Then colored layers 13a, 13b, 13c of red, green and blue colors were prepared in the same manner as in the first embodiment.

(iii) Subsequently a light shielding aluminum layer 14 was deposited selectively in areas where said colored layers were absent, by the CVD process employing DMAH as in the first embodiment.

(iv) Then, on said substrate, an ITO layer of a thickness of 1000 Å was deposited by sputtering, as a second transparent electrode layer 16.

(v) An orienting polyimide layer 15 was formed on the entire surface of the substrate as in the first embodiment, and a rubbing process was conducted to complete the substrate with color filters.

1(vi) A separately prepared TFT substrate, bearing thin film transistors utilizing poly-silicon deposited by low pressure CVD, was positioned opposite to and adhered to the above-mentioned substrate with color filters, and ferroelectric liquid crystal was filled in the gap between said substrates and sealed therein to obtain the color liquid crystal display device of the present invention.

The display device of the present embodiment, in comparison with that of the first embodiment, showed a decreased capacitance because of the absence of the colored layers between the thin film transistors and the ITO layer constituting the counter electrode. Also it showed satisfactory function without defect in the orientation of ferroelectric liquid crystal resulting from the steps in the colored layers, as the substrate with color filters had a flat surface. Also the aperture ratio per pixel was 80% or higher as in the first embodiment.

EMBODIMENT 3

The present embodiment is a case in which the electronic device is a liquid crystal display panel with an improved spacer structure.

FIGS. 13 to 16 illustrate the steps of a method for producing the liquid crystal display panel of the present embodiment.

Figure 13:
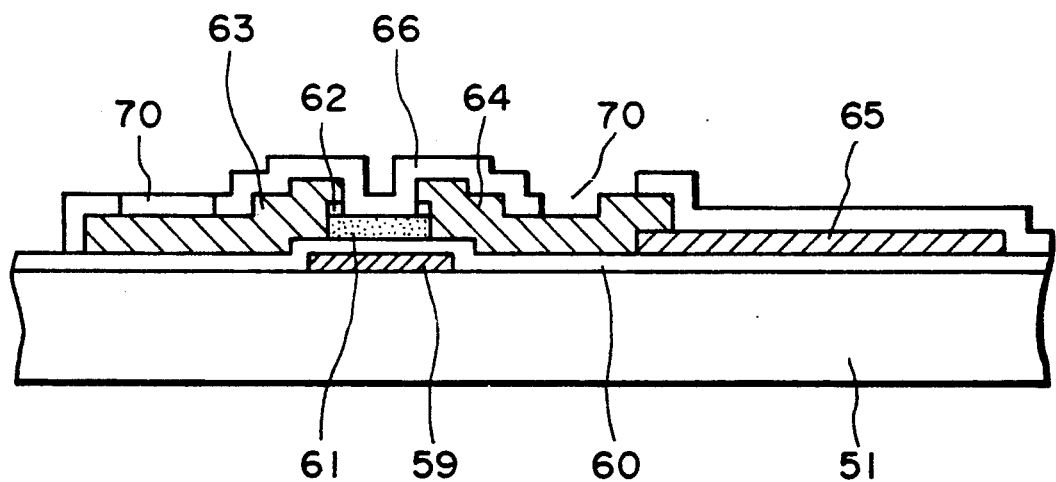
FIGS. 13 to 16 are cross-sectional views showing a method of producing a liquid crystal display panel constituting a third embodiment of the present invention.

At first, on a first glass substrate 51, chromium was deposited with a thickness of 1000 Å by evaporation and was patterned to form a gate electrode 59 as shown in FIG. 13. Then a silicon oxide film of a thickness of 1000 Å was deposited by sputtering to form a gate insulation film 60. Then a pixel display electrode 65 was formed, and amorphous silicon as a semiconductor layer 61 of a thickness of 1000 Å and amorphous silicon containing phosphor with a concentration of $1 \times 10^{20}$ atom/cm$^3$ as a low-resistance semiconductor layer 62 were deposited and patterned to leave an island on the gate electrode 59. Subsequently aluminum was deposited with a thickness of 5000 Å as a drain electrode 63 and a source electrode 64, then a silicon nitride film was deposited as an inorganic protective film 66, and apertures 70 were formed on said drain electrode 63 and source electrode 64. The apertures 70 are sized 1-4 μm in lateral length, and may be positioned not only on the drain and source electrodes but also on the wirings therefor.

Figure 14:
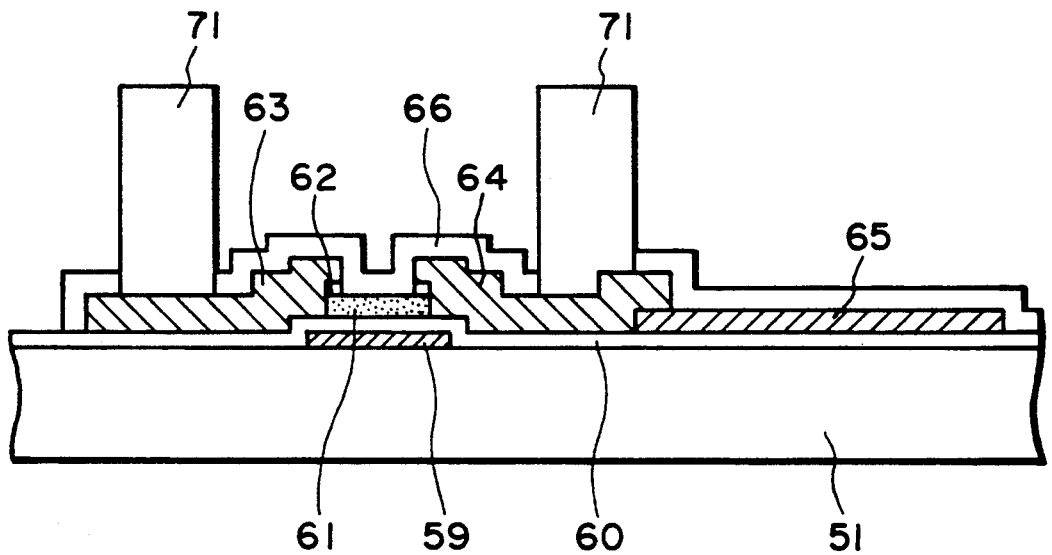

Then, as shown in FIG. 14, aluminum layers 71 were deposited with a thickness of 3.9 μm selectively on the apertures 70, by the CVD process utilizing DMAH (dimethylaluminum hydride). The thickness of said aluminum layers 71 is within a range of 1 to 15 μm, preferably 1 to 10 μm.

The selective CVD process of aluminum or a metal principally composed of aluminum, which enables satisfactory exploitation of the present invention, was already explained in the foregoing, but said process will be explained again in relation to the present embodiment, with reference to FIGS. 17 to 19.

Figure 17:
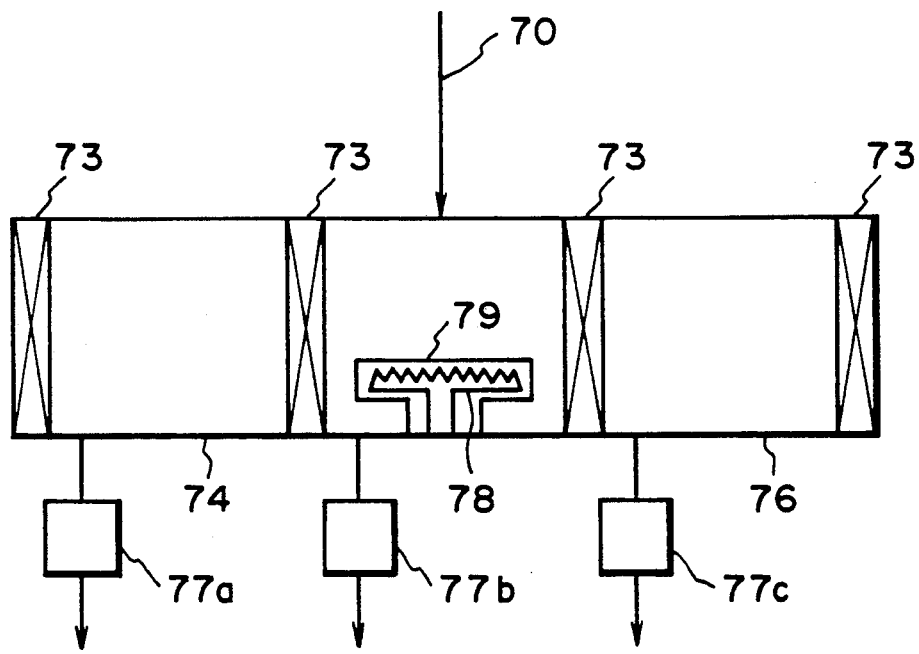
FIG. 17 is a view showing steps of a metal film depositing apparatus adapted for use in the third embodiment of the present invention.

As shown in FIG. 17, a continuous metal film forming apparatus, for forming an aluminum film or a metal film principally composed of aluminum, is composed of a loading chamber 74, a CVD reaction chamber (first film forming chamber) 75, and an unloading chamber 76 which can be sealed from the external atmosphere and can be mutually communicated by gate valves 73 and can be evacuated or reduced in pressure respectively by vacuum systems 77a-77c.

The loading chamber 74 is provided for replacing the atmosphere of the substrate before the deposition with hydrogen, in order to improve the throughput.

The next CVD reaction chamber 75, for effecting selective deposition on the substrate under a normal or reduced pressure, is provided therein with a substrate holder 79 with a resistance heater 78 for heating to 200°–430° C. and is further provided with a gas line 80 for introducing gaseous components into said chamber.

The final unloading chamber 76 is provided for replacing the atmosphere with nitrogen, as a final adjustment before the substrate after the metal film deposition is taken out to the exterior.

Figure 18:
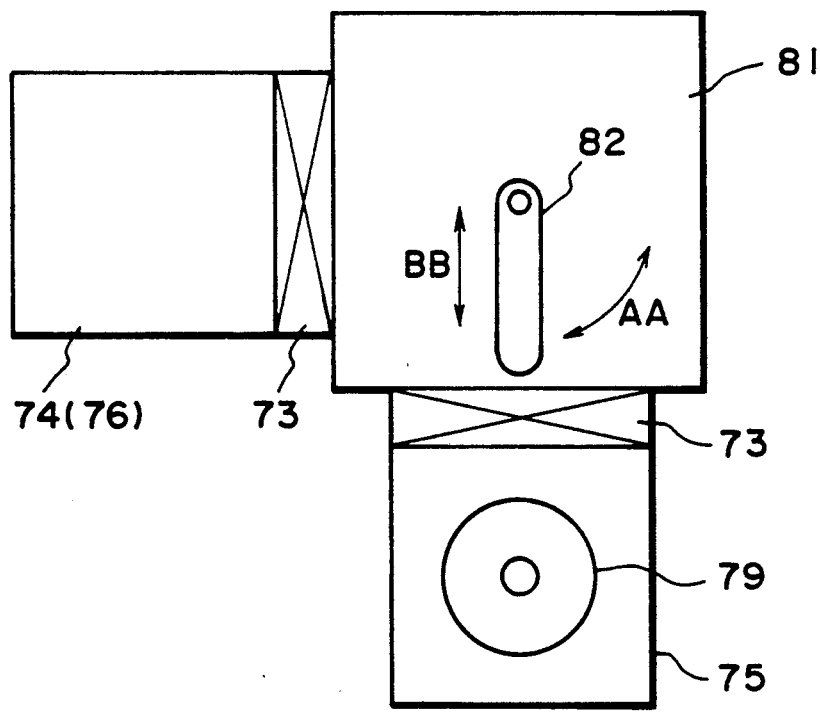
FIG. 18 is a schematic plan view of said metal film depositing apparatus.
Figure 19:
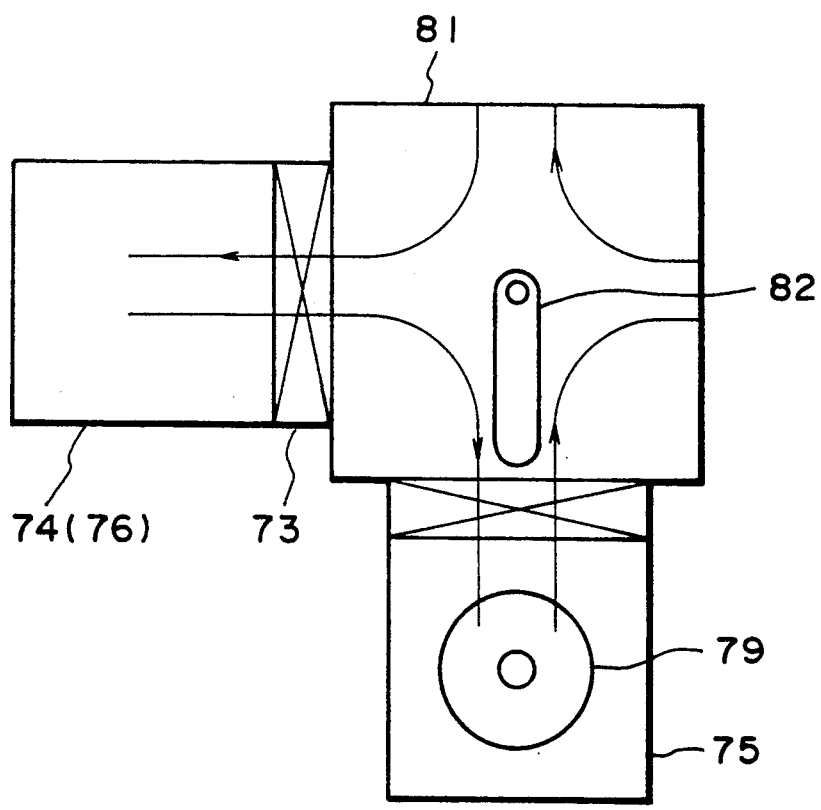
FIG. 19 is a schematic plan view of said metal film depositing apparatus in which the sequence of movement of a first glass substrate is represented by arrow in case of thin metal film deposition on said substrate.

The above-explained continuous metal film forming apparatus is constructed in practice, with a structure shown in FIG. 18 in which the loading chamber 74, CVD reaction chamber 75 and unloading chamber 76 are mutually connected through a transport chamber 81. In this structure the loading chamber 74 serves also as the unloading chamber 76. In said transport chamber 74 there is provided an arm (transport means) 82 which is rotatable in both directions as indicated by an arrow A—A and extendable and retractable in directions B—B. Said arm 82 can move the glass substrate from the loading chamber 74 to the CVD reaction chamber 75, then to the unloading chamber 76 according to the process in succession and without exposure to the external atmosphere, as indicated by arrows in FIG. 19.

The aluminum film formation on the first glass substrate 51 is conducted in the following manner.

At first the first glass substrate 51 is placed in the loading chamber 74, of which atmosphere is replaced by hydrogen as explained before. Then the interior of the reaction chamber 75 is evacuated by the vacuum system 77b approximately to $1 \times 10^{-80}$ Torr.

However the aluminum film formation is possible even if the pressure in the reaction chamber 75 is higher than $1 \times 10^{-8}$ Torr.

Then dimethylaluminum hydride (DMAH) is supplied from an unrepresented gas line, with hydrogen as carrier gas. As alkylaluminum hydride, monomethylaluminum hydride (Al(CH$_3$)H$_2$; MMAH) may be utilized instead of DMAH.

Also hydrogen is introduced from an unrepresented second gas line, and the aperture of an unrepresented slow leak valve is adjusted to maintain the reaction chamber 75 at a predetermined pressure. The typical total pressure is about 1.5 Torr, with a DMAH partial pressure of about $5.0 \times 10^{-3}$ Torr. Subsequently the resistance heater 78 of the substrate holder 79 is energized to directly heat the substrate, whereby aluminum is deposited solely on the electron-donating surface of the substrate. The obtained deposited film has satisfactory flatness and durability, and can therefore serve as an extremely excellent functional member.

The surface temperature of the first glass substrate was maintained at 270° C. by said direct heating.

After said aluminum deposition, the CVD reaction chamber 75 is evacuated, by the vacuum system 77b, to a pressure of $5 \times 10^{-3}$ Torr or lower.

Under the above-mentioned depositing conditions, aluminum was deposited with a speed of 3000 Å/min. selectively on the drain electrode 63 and the source electrode 64 on the first glass substrate 51, and the deposition was conducted for 13 minutes.

Then, after the loading chamber 74 (76) is evacuated to $5 \times 10^{-3}$ Torr or lower, the gate valve 73 is opened and said substrate 51 is transferred. After said gate valve 73 is closed, nitrogen gas is introduced to the atmospheric pressure in the loading chamber 74 (76), and the substrate is taken out from the apparatus through the gate valve 73.

Figure 15:
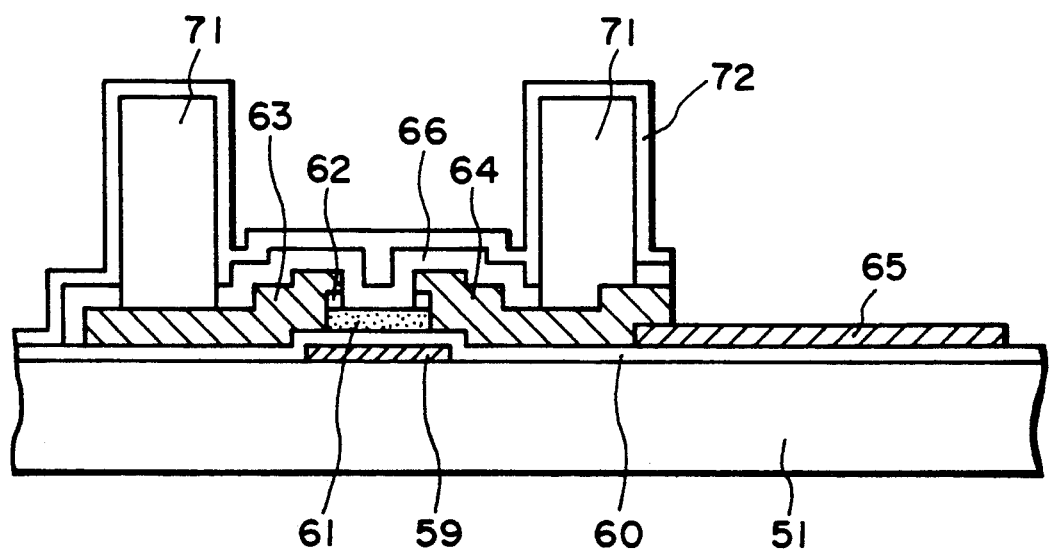

Then, as shown in FIG. 15, a silicon nitride film of a thickness of 3000 Å was deposited as an inorganic protective film 72, and the inorganic protective films 62, 72 on the pixel display electrode 65 were removed.

Figure 16:
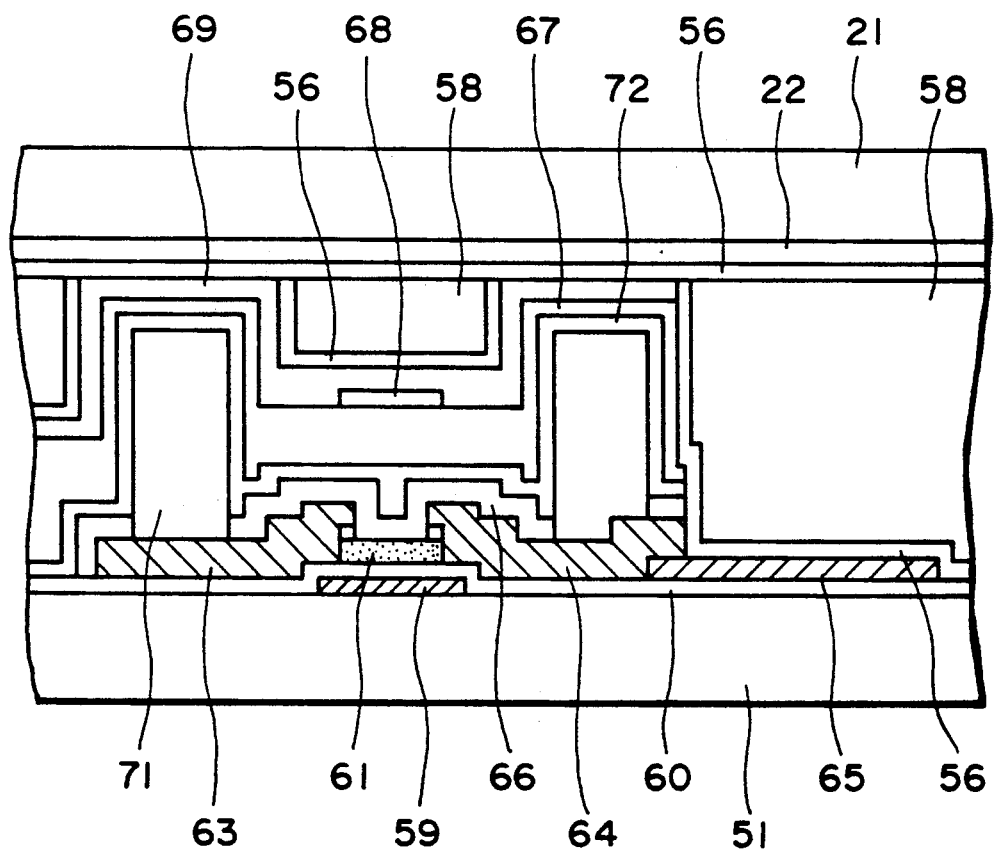

Subsequently a polyimide film 67 was coated and cured as shown in FIG. 16, and a light shield layer 68 was formed above the semiconductor layer 61, across said polyimide film 67. Furthermore there were formed an organic protective film 69 and a liquid crystal orienting film 56.

Then a second glass substrate 21, on which a transparent counter-electrode 22 and a liquid crystal orienting film 56 were separately prepared, is adhered to said first glass plate 51, and liquid crystal 58 is filled between the substrates 51 and 21.

In the foregoing description, the thin film transistor is obtained by forming the gate electrode 59, gate insulation film 60 and semiconductor layer 61 in succession on the first glass substrate 51, but it may also be obtained by forming the semiconductor layer 61, gate insulation film 60 and gate electrode 59 in this order on the substrate 51. Also the semiconductor layer 61 may be composed of polycrystalline silicon instead of amorphous silicon.

Also the first substrate 51 and the second substrate 21, which are to bear the liquid crystal orienting films 56 on the surfaces thereof, may be composed of quartz or a plastic material, instead of glass.

Furthermore, the thin film device 52 may be composed of a MIM (metal-insulator-metal) diode instead of the thin film transistor.

Furthermore, the drain electrode 63 and the source electrode 64 may be composed, instead of aluminum explained in the present embodiment, of an aluminum alloy such as aluminum-silicon (Al-Si), aluminum-titanium (Al-Ti) or aluminum-silicon-copper (Al-Si-Cu); a high-melting metal such as titanium (Ti), tungsten (W) or molybdenum (Mo); a silicide such as titanium silicide (TiSi), tungsten silicide (WSi) or molybdenum silicide (MoSi); or amorphous, polycrystalline or monocrystalline silicon containing an N-type impurity such as phosphor or arsenic or a P-type impurity such as boron.

Furthermore, the aluminum layer 71 may be replaced by a metal principally composed of aluminum, such as aluminum-silicon, to be deposited by means of DMAH, silicon-containing gas and hydrogen.

As explained in the foregoing, in the substrate with color filters constituting the color liquid crystal display device, the present invention allows to form a light shield layer by selective aluminum deposition solely on the transparent electrodes where the colored layers are absent, utilizing selective aluminum deposition solely on an electron-donating substrate in a CVD process employing alkylaluminum hydride as the raw material gas, thereby achieving self-alignment of the colored layers and the light shielding layer and thus improving the aperture ratio of the liquid crystal display device. Also the present invention can provide a substrate with color filters, having a completely flat surface, by selecting the thickness of the light shielding aluminum layer same as that of the colored layers, thereby avoiding the defects in orientation of liquid crystal, resulting from the surface steps in the substrate, for example in the ferroelectric liquid crystal.

Also the present invention enables selective deposition of monocrystalline aluminum with excellent surface properties and durability, which can therefore be used for purposes other than electrode.

Furthermore, the present invention enables, in the liquid crystal display panel, to form spacers of well-defined positions on the wirings of the thin film devices, utilizing selective deposition of aluminum or a metal principally composed of aluminum, thereby preventing defects in said thin film devices resulting from pressure applied to said spacers.

What is claimed is:

1. An electronic device, comprising:
   a liquid crystal display comprising: a pair of substrates, a liquid crystal material disposed between said substrates, and a thin film device provided on one of said substrates;
   an insulating film disposed on said thin film device, said insulating film being provided with a hole which exposes a conductive or semiconductive portion of said thin film device; and
   a metallic body serving as a spacer;
   wherein said metallic body is formed on said conductive or semiconductive portion via said hole.

2. A device according to claim 1, wherein said metallic body comprises a metal including aluminum as a substantial component.

3. A device according to claim 1, wherein an insulating film is formed on a surface of said metallic body.

4. A method for producing a liquid crystal display which comprises a pair of substrates and a liquid crystal material disposed between said substrates, comprising the steps of:
   forming a thin film device on one of said substrates;
   forming an insulating film with a hole on said thin film device so as to expose a conductive or semiconductive portion of said thin film device;
   forming a metallic body on said conductive or semiconductive portion via said hole, said metal body defining a spacer; and
   positioning the other of said substrates on said metallic body.

5. A method according to claim 4, wherein said metallic body is formed only on said conductive or semiconductor portion according to a selective CVD process.

6. A method according to claim 5, wherein said metallic body comprises a metal including aluminum as a substantial component.

7. A method according to claim 4, wherein an insulating film is formed on a surface of said metallic body.

* * * * *

UNITED STATES PATENT AND TRADEMARK OFFICE
CERTIFICATE OF CORRECTION

PATENT NO. : 5,181,132
DATED : January 19, 1993
INVENTOR(S) : HITOSHI SHINDO, ET AL.

It is certified that error appears in the above-identified patent and that said Letters Patent is hereby corrected as shown below:

COLUMN 3

Line 57, "Also" should read --Also,--.

COLUMN 4

Line 63, "For example" should read --For example,--.
Line 64, "Also" should read --Also,--.

COLUMN 5

Line 2, "Furthermore" should read --Furthermore,--.
Line 48, "For example" should read --For example,--.
Line 52, "300" should read --3000--.
Line 57, "Also" should read --Also,--.

COLUMN 6

Line 31, "$Si(CH_3)_4$," should read --$Si(CH_3)_4$, $SiCl_4$,--.

COLUMN 9

Line 15, "following" should read --following,--.
Line 49, "subjected" should read --subjected to--.

COLUMN 10

Line 3, "Subsequently" should read --Subsequently,--.
Line 11, "However" should read --However,--.
Line 25, "manner" should read --manner,--.
Line 35, "Subsequently" should read --Subsequently,--.

UNITED STATES PATENT AND TRADEMARK OFFICE
CERTIFICATE OF CORRECTION

PATENT NO. : 5,181,132               Page 2 of 3
DATED      : January 19, 1993
INVENTOR(S): HITOSHI SHINDO, ET AL.

It is certified that error appears in the above-identified patent and that said Letters Patent is hereby corrected as shown below:

COLUMN 11

Line 1,  "Then" should read --Then,--.
    Line 4,  "Subsequently" should read --Subsequently,--.
    Line 15, "1(vi)" should read --(vi)--.
    Line 27, "Also" should read --Also,--.
    Line 31, "Also" should read --Also,--.
    Line 44, "Then" should read --Then,--.
    Line 52, "Subsequently" should read --Subsequently,--.

COLUMN 12

Line 57, "Also" should read --Also,--.
    Line 62, "Subsequently" should read --Subsequently,--.

COLUMN 13

Line 22, "Subsequently" should read --Subsequently,--.
    Line 25, "Furthermore" should read --Furthermore,--.
    Line 39, "Also" should read --Also,--.
    Line 41, "Also" should read --Also,--.

COLUMN 14

Line 7,  "Also" should read --Also,--.
    Line 13, "example" should read --example,--.
    Line 15, "Also" should read --Also,--.

UNITED STATES PATENT AND TRADEMARK OFFICE
CERTIFICATE OF CORRECTION

PATENT NO. : 5,181,132
DATED : January 19, 1993
INVENTOR(S) : HITOSHI SHINDO, ET AL.

It is certified that error appears in the above-identified patent and that said Letters Patent is hereby corrected as shown below:

<u>COLUMN 14</u>

Line 53, "metal body" should read --metallic body--.

Signed and Sealed this

Fifteenth Day of February, 1994

Attest:

BRUCE LEHMAN

Attesting Officer  Commissioner of Patents and Trademarks